United States Patent [19]
Ohsawa

[11] Patent Number: 5,872,603
[45] Date of Patent: Feb. 16, 1999

[54] ANALOG CIRCUIT CONTROLLER USING SIGNALS INDICATIVE OF CONTROL VOLTAGE AND TYPE OF CONTROL VOLTAGE

[75] Inventor: Ikuo Ohsawa, Kiryu, Japan

[73] Assignee: Sanyo Electric Co., Ltd., Osaka, Japan

[21] Appl. No.: 310,405

[22] Filed: Sep. 22, 1994

[30] Foreign Application Priority Data

Oct. 29, 1993 [JP] Japan .................................. 5-272368
Nov. 17, 1993 [JP] Japan .................................. 5-288247

[51] Int. Cl.$^6$ ...................................................... H04N 5/18
[52] U.S. Cl. .......................... 348/691; 348/512; 348/705; 307/130; 315/386; 341/152
[58] Field of Search ..................................... 348/571, 572, 348/645, 649, 671, 673, 687, 691, 705, 706; 315/367, 386; 341/120, 122, 144, 152; 307/116, 130; H04N 5/57, 5/18, 9/68

[56] References Cited

U.S. PATENT DOCUMENTS

| | | | |
|---|---|---|---|
| 3,996,582 | 12/1976 | Sinobad | 315/367 |
| 4,879,625 | 11/1989 | Potenzone | 307/130 |
| 5,231,475 | 7/1993 | Ritter et al. | 349/649 |
| 5,239,243 | 8/1993 | Rothe et al. | 315/367 |
| 5,262,680 | 11/1993 | Hu | 307/130 |

FOREIGN PATENT DOCUMENTS

| | | |
|---|---|---|
| 59-116995 | 7/1984 | Japan . |
| 2 287 933 | 11/1990 | Japan . |
| 3 038 703 | 2/1991 | Japan . |
| 2247547 | 3/1992 | United Kingdom ............ G06F 11/30 |
| 2247 547 | 4/1992 | United Kingdom . |

Primary Examiner—John K. Peng
Assistant Examiner—Jeffrey B. Murrell
Attorney, Agent, or Firm—Armstrong, Westerman, Hattori, McLeland & Naughton

[57] ABSTRACT

An analog circuit controller having fewer signal paths and elements is disclosed herein. A microcomputer has a first D/A converter for generating control voltages variable into a plurality of levels in a time-divided manner and a second D/A converter for generating switching signals of various levels each indicative of the type of a control voltage. The analog circuit controller receives the outputs of the first and second D/A converters and responds to the output of the second D/A converter to select the necessary circuit to be controlled to which the control voltage is to be applied. As a result, a plurality of circuits to be controlled can be controlled through only two signal lines.

4 Claims, 5 Drawing Sheets

ANALOG CIRCUIT CONTROLLER USING SIGNALS INDICATIVE OF CONTROL VOLTAGE AND TYPE OF CONTROL VOLTAGE

BACKGROUND OF THE INVENTION

1. Field of the Invention

The present invention relates to an analog circuit controller and particularly a controller for controlling a plurality of analog circuits in an analog IC through two different analog signals.

2. Description of the Prior Art

TV receivers and audio instruments may control an IC for processing analog signals through control signals from a microcomputer. In a TV receiver, for example, commands from a TV viewer which are indicative of tint, color density and others, in television signals, may be temporarily taken by a micro computer and then applied from the microcomputer to an analog IC.

One of such controllers is shown in FIG. 1. It comprises a microcomputer 1 including a plurality of PWM (Pulse Width Modulation) circuits 2–4 located therewithin and integrating circuits 5–7 for converting the modulated pulses from the PWM circuits into analog signals which are in turn applied to circuits to be controlled 9–11 in an analog IC (8). However, the controller of FIG. 1 requires one control line for every control function to be carried out. If the number of pins in the microcomputer and IC is increased, the wiring in such a controller will become undesirably complicated.

To overcome such a problem, there has been proposed a method of time dividing digital signals and transmitting the divided digital signal through clock and data lines, as shown in FIG. 2. Digital data are applied from a microcomputer 1 to an analog IC 8 in synchronism with clock signals. The analog IC 8 includes an address control circuit 12 for decoding the incoming digital data and for judging which circuit to be controlled the data are to be transmitted to, so that the digital data will be distributed to an appropriate circuit to be controlled. The digital data are converted into analog signals through D/A conversion circuits 13–15 before they are applied to circuits to be controlled 9–11.

The method of FIG. 2 can transmit different types of control signals through only two signal lines. However, the method of FIG. 2 requires a plurality of D/A conversion circuits 13–15 in the analog IC 8. In general, an analog IC having many D/A conversion circuits, each of which is also formed having an increased number of elements, raises a problem in that the chip area increases.

On the other hand, the microcomputer 1 is formed by MOSIC and therefore does not raise any problem even if there are many D/A conversion circuits. It is therefore desired that a transmission process for performing the D/A conversion in the microcomputer using less signal lines is provided.

SUMMARY OF THE INVENTION

In view of the above problems, the present invention provides a microcomputer comprising a first D/A converter for generating control voltages, variable into a plurality of levels, in a time-divided manner and a second D/A converter for generating switching signals of various levels, each indicative of the type of a control voltage in synchronism with the time-division timing for the control voltages.

The present invention also provides an analog circuit controller comprising a first input terminal to which a control voltage variable into a plurality of levels is applied in a time-divided manner, a second input terminal for receiving switching signals of various levels each indicative of the type of the control voltage in synchronism with the time-division timing for said control voltages, a plurality of DC hold circuits each for holding the control voltage applied thereto through said first input terminal as a DC voltage which is in turn applied to the corresponding circuit to be controlled, and a comparison/switching control circuit including a plurality of comparators and being operative to discriminate the level of a switching signal from said second input terminal so as to actuate the corresponding DC hold circuit.

In such an arrangement, the control voltage can be delivered by the microcomputer in a time-divided manner while delivering the switching signal indicative of the type of the control voltage in the time-divided control voltage. On the other hand, the analog circuit controller receives these two signals to discriminate the level of the switching signal by the comparators and to select the corresponding DC hold circuit which in turn holds the control voltage as a DC voltage. Finally, this control voltage will be applied to the corresponding circuit to be controlled. According to the present invention, further, the control voltage and switching signal are delivered within vertical pulse periods, during which no TV scene will be displayed.

DETAILED DESCRIPTION OF THE PREFERRED EMBODIMENTS

Figure 1:
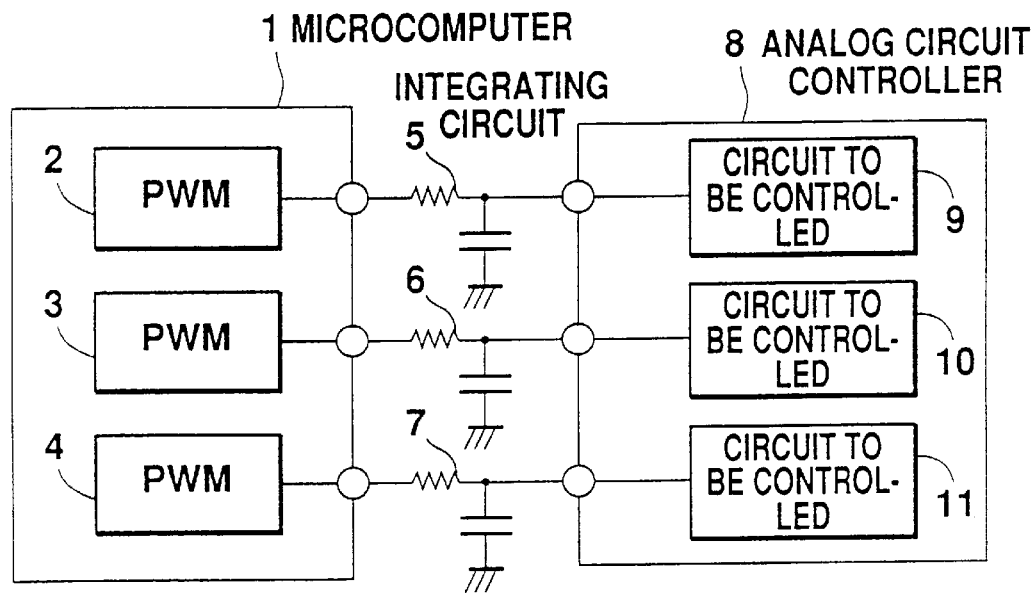
FIG. 1 is a view of an analog circuit controller constructed according to the prior art.
Figure 2:
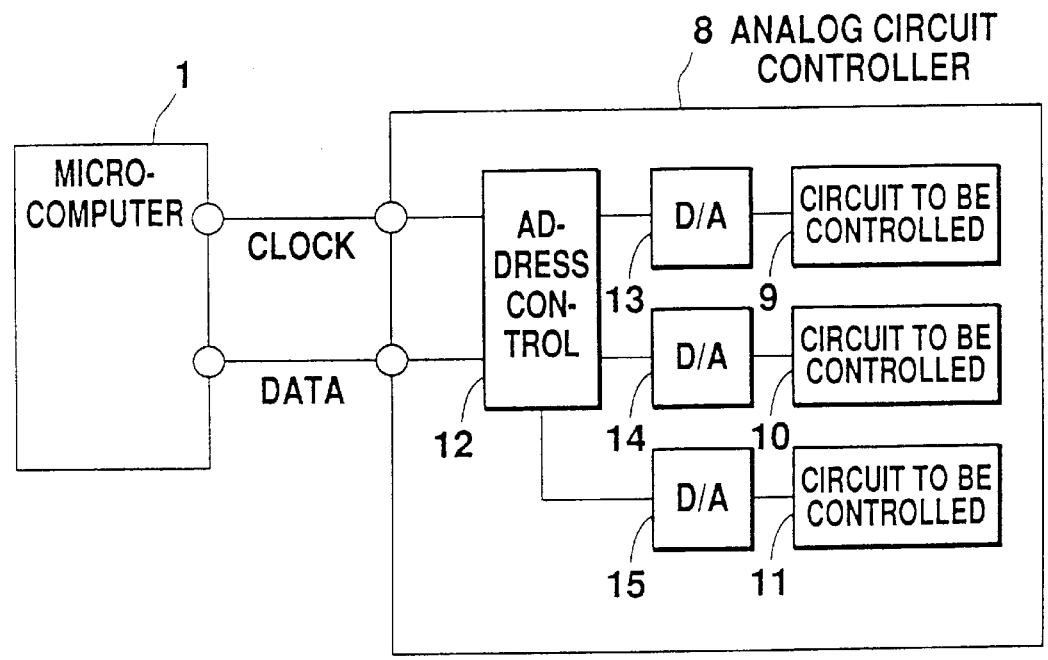
FIG. 2 is a view of another analog circuit controller constructed according to the prior art.
Figure 3:
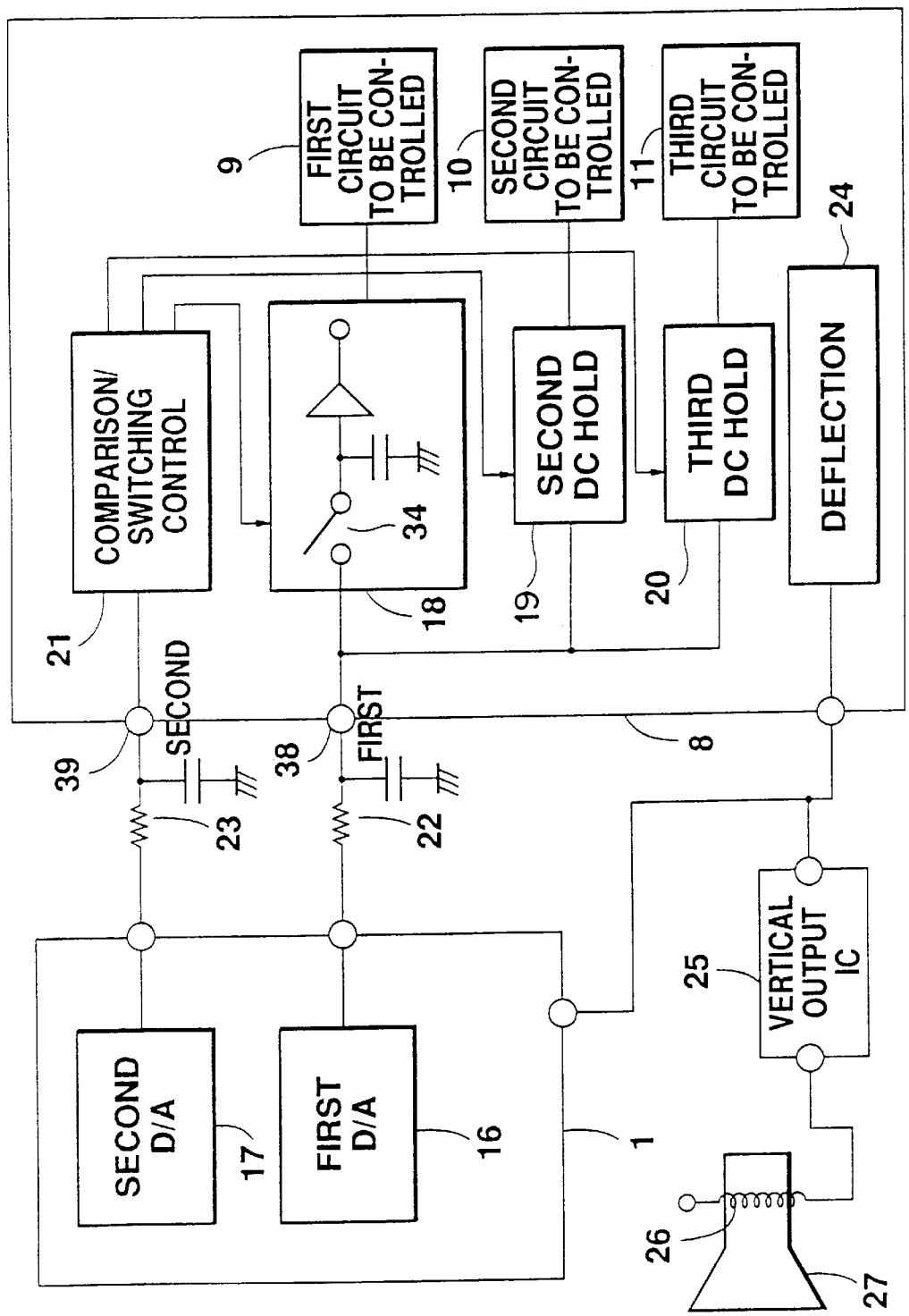
FIG. 3 is a view of an analog circuit controller constructed according to the present invention.

FIG. 3 shows a controller according to the present invention which comprises a first D/A converter 16 for generating a TV signal control voltage variable into a plurality of levels in a time-divided manner, a second D/A converter 17 for generating switching signals each indicative of the type of the control voltage in synchronism with the time-division timing for the control voltage, first to third DC hold circuits 18, 19 and 20 each for receiving the control voltage from the first D/A converter 16 and for applying a DC voltage held by the DC hold circuit itself to the corresponding one of first to third circuits to be controlled 9, 10 and 11, a comparison/switching control circuit 21 including a plurality of comparators and being operative to discriminate the level of a switching signal from the second D/A converter 17 and to actuate the corresponding one of said DC hold circuits, filters 22 and 23 for removing noise in the output signals of the first and second DC hold circuits 16 and 17, a deflection circuit 24 for applying vertical pulses in TV signals to a vertical output IC 25 and the microcomputer 1, a Braun tube 27 having a deflection coil (26) for receiving vertical deflection pulses from said vertical output IC 25, and first and second input terminals 38 and 39.

Figure 4:
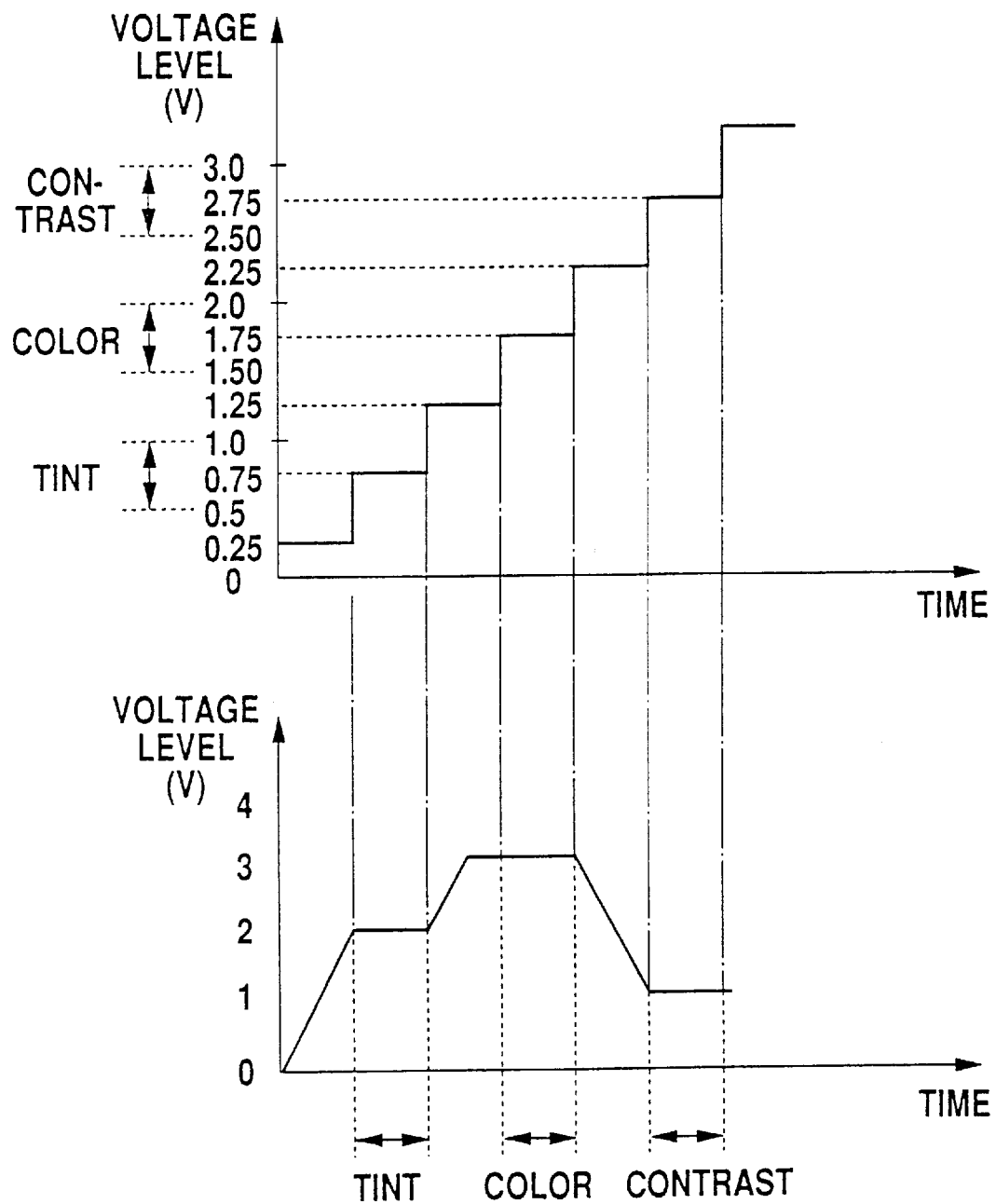
FIG. 4 shows waveforms illustrating the operation of the analog circuit according to the present invention.

FIG. 4 shows waveforms illustrating the operation of this embodiment. The upper part of FIG. 4 shows various levels of output signal from the second D/A converter 17 while the lower part thereof shows various levels of output signal from the first D/A converter 16. The horizontal axes of FIG. 4 represent time, and with the passage of time, the tint, color and contrast in TV signals are controlled.

The tint will be described first. The level of a tint switching signal generated by the second D/A converter 17 is set at any level within a range between 0.5V and 1.0V. In this embodiment, it is 0.75V. During a period in which the tint switching signal of 0.75V is generated, the first D/A converter 16 generates a control voltage of 2V which is in turn applied to the first to third DC hold circuits 18–20 in the analog IC 8. On the other hand, the comparison/switching control circuit 21 distinguishes from the level of the 0.75V switching signal that the incoming control voltage is a tint control signal, and actuates only the first DC hold circuit 18. Thus, the first DC hold circuit 18 holds the 2V control voltage which is in turn applied to the first circuit to be controlled 9. As a result, the tint can be controlled according to this embodiment.

The system of FIG. 3 executes a plurality of controls with the passage of time. In general, therefore, another control (e.g., for brightness) will be carried out before the first DC hold circuit 18 holds the 2V control voltage. If the level of one control voltage is greatly different from that of the next control voltage, time may be required at the transition between these two control voltages under influence of the time constant in the filter 22. According to the present invention, thus, a time period during which the first to third DC hold circuits 18–20 are inhibited to hold the input voltage is provided at the boundary between two time-divided controls. Since the next control voltage is applied from the first D/A converter 16 to the pins of the analog IC 8 even during such a time period, the control voltage can stably be taken in after termination of the inhibiting period. With the tint control, the second D/A converter 17 generates a control voltage of 0.25V before the 0.75V control voltage is generated, as shown in FIG. 4. As the 0.25V control voltage is applied to the comparison/switching control circuit 21, the latter inhibits the first to third DC hold circuits 18–20 from taking inputs in.

Figure 5:
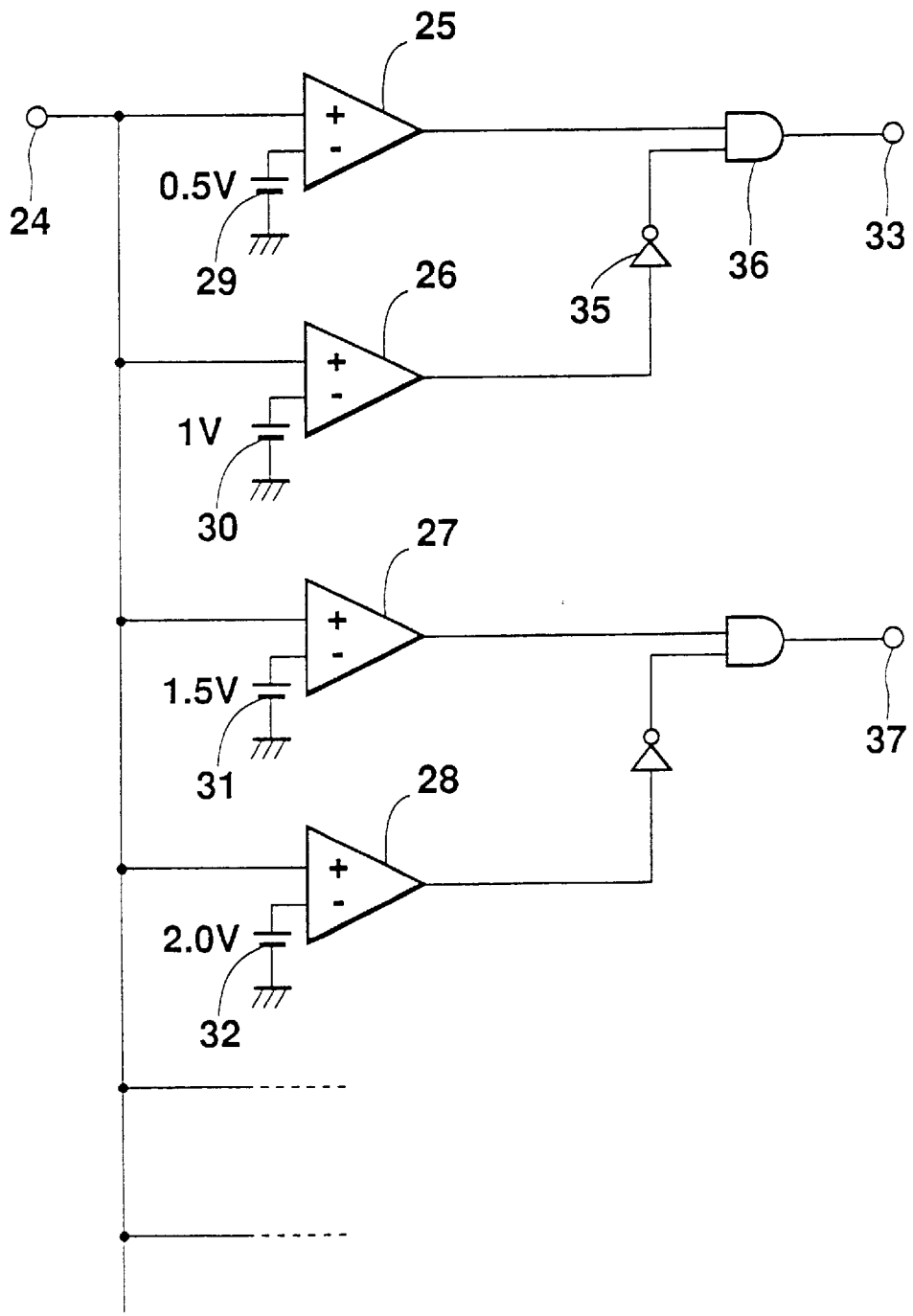
FIG. 5 is a circuit diagram showing the details of the comparison/switching control circuit in the analog circuit of the present invention.

FIG. 5 is a circuit diagram showing the details of the comparison/switching control circuit 21 of FIG. 3. It is now assumed that a switching signal of 0.75V is applied to the input terminal 24 during the tint control period of FIG. 4. The reference voltages 29–32 of the first to fourth comparators 25–28 are set at 0.5V, 1V, 1.5V and 2.0V, respectively. Thus, only the output of the first comparator 25 is at [H] level while the outputs of all the other comparators are at [L] level. As a result, the output terminal 33 becomes [H] level during which only the switch 34 of the first DC hold circuit 18 is closed. In other words, the first and second comparators 25, 26 operate together with an inverter 35 and an AND gate 36 to form a window comparator and detects the input voltage being between 0.5V and 1.0V, as a [H] level.

If a switching signal of 0.25V is applied to the input terminal 24, the levels of both the output terminals 33 and 37 become [L] level. Therefore, the first to third DC hold circuits 18–20 are stopped from taking-in signals.

The process proceeds to the color control step. A switching signal of 1.25V is applied to the input terminal 24 shown in FIG. 5. The output terminals 33 and 37 become [L] level. As a switching signal of 1.75V is then applied to the input terminal 24, only the output terminal 37 becomes [H] level so that the second DC hold circuit 19 of FIG. 3 takes a control voltage of 3V shown in FIG. 4. As a result, the color control voltage can be applied to the second circuit to be controlled 10. The contrast control can be carried out in the similar manner.

The transmission of a signal from the microcomputer 1 to the analog IC 8 should not be carried out during a period in which an TV scene image is displayed. This is because EMI noise from the pins adversely affects the image signals in the TV scene since pulsed signals are transmitted through the pins of the IC. The first to third DC hold circuits 18–20 in the analog IC 8 cannot stop their operations immediately after termination of the DC taking-in period, but will slightly discharge the charges in the charged capacitor. Thus, a DC signal having a DC offset appears at the output of the DC hold circuits. Such a DC offset changes the degree of control relative to the circuits to be controlled in the analog IC 8. Thus, the DC offset will directly influence the TV scene.

According to the present invention, therefore, the transmission of a signal will be carried out only during a period in which no image will be displayed in the TV scene. There is no problem even if EMI noise is generated through the IC pins and further, even though an offset is generated in the initial value of a DC voltage to be transmitted, so long as the final value thereof is fixed, there is no problem.

The embodiment of FIG. 3 will now be described. This embodiment performs the transmission of a signal only during the vertical pulse period. Vertical pulses generated by the deflection circuit 24 in the analog IC 8 are applied to the vertical output IC 25 and then to the vertical deflection coil 26 in the Braun tube 27. The vertical pulses are also taken in by the microcomputer 1 which in turn uses them as triggers to generate the switching signal and control voltage shown in FIG. 4. During the vertical pulse period, each of the first to third DC hold circuits 18–20 may make one control or two or more controls, if necessary.

Figure 6:
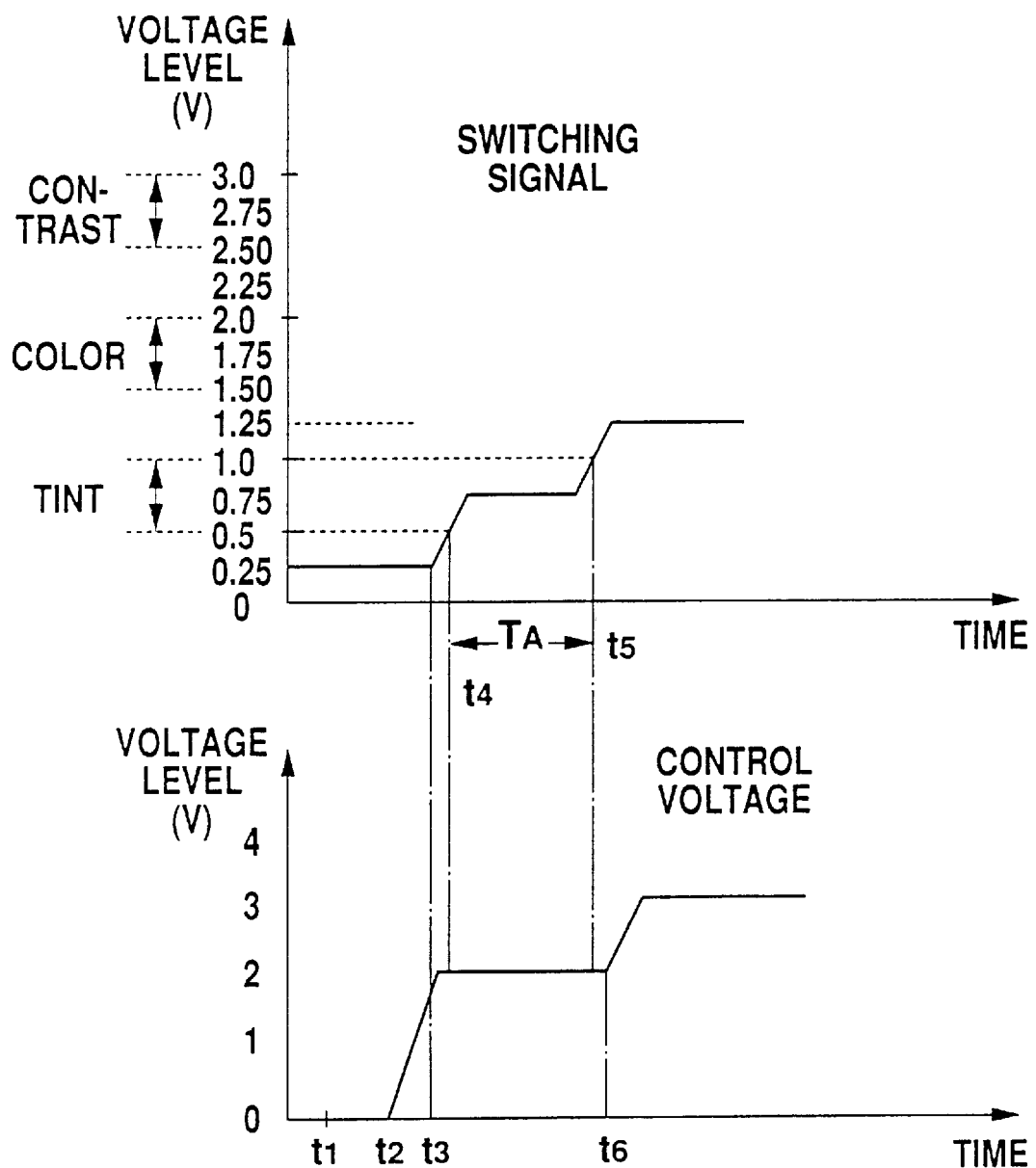
FIG. 6 is a view showing the details of the waveforms in FIG. 4.

FIG. 6 shows the details of the waveform shown in FIG. 4. The upper part of FIG. 6 represents a switching signal while the lower part thereof denotes a control voltage. At time t1, when a vertical pulse reaches its lowest level, the microcomputer 1 recognizes the arrival of the vertical pulse. At time t2, after a predetermined time period, a control voltage is first generated. At time t3, whereat it is expected that the control voltage is stabilized, a switching signal is transmitted to the comparison/switching control circuit. Thus, the system can take in a stable voltage (2V). At time t4, the switching signal enters the range of tint (from 0.5V to 1.0V) so that the voltage (2V) will be taken in by the system. The taking-in operation continues until time t5, where said range of tint is exceeded. At time t6 after a predetermined period from the time t5, the transition of the control voltage is initiated. These times may previously be computed and programmed in the microcomputer 1 so as to be able to perform a stabilized transmission of control voltage.

Such a transmission may be carried out without vertical pulses. If the transmission is to be made through the vertical pulse, however, it is only necessary to decide the final voltage to be held without considering the order of t3 and t4 shown in FIG. 6.

As described above, the system can be formed by fewer elements since the microcomputer includes the D/A converters and the comparison/switching control circuit is disposed in the analog IC. According to the present invention, further, any adverse affects on a TV scene can be prevented since the transmission of tile control voltage is carried out only during the vertical pulse period.

I claim:

1. An analog circuit controller using an external control voltage to control a plurality of circuits to be controlled in an analog IC, comprising:
- a first input terminal to which the control voltage variable into a plurality of levels is applied in a time-divided manner;
- a second input terminal for receiving switching signals of variable levels each indicative of the type of the control voltage in synchronism with time-division timing for said control voltages;
- a plurality of DC hold circuits each for holding the control voltage applied thereto through said first input terminal as a DC voltage which is in turn applied to a corresponding one of said plurality of circuits to be controlled; and
- a comparison/switching control circuit including a plurality of comparators and being operative to discriminate the level of one of the switching signals from said second input terminal so as to actuate a corresponding DC hold circuit.

2. The analog circuit controller as defined in claim 1, further comprising a deflection circuit for generating a TV signal vertical pulse and wherein said controller is operative to take signals through said first and second input terminals during a period in which said vertical pulse is generated.

3. An analog circuit control system comprising:
- a microcomputer including
  - a first D/A converter for generating control voltages variable into a plurality of levels in a time-divided manner, and
  - a second D/A converter for generating switching signals of variable levels each indicative of the type of a control voltage in synchronism with time-division timing of the control voltages; and
- an analog circuit controller using the control voltages to control a plurality of circuits to be controlled in an analog IC, including
  - a first input terminal to which the control voltage variable into a plurality of levels is applied in a time-divided manner;
  - a second input terminal for receiving switching signals of variable levels each indicative of the type of the control voltage in synchronism with time-division timing for said control voltages;
  - a plurality of DC hold circuits each for holding the control voltage applied thereto through said first input terminal as a DC voltage which is in turn applied to a corresponding one of said plurality of circuits to be controlled; and
  - a comparison/switching control circuit including a plurality of comparators and being operative to discriminate the level of one of the switching signals from said second input terminal so as to actuate a corresponding DC hold circuit;

wherein the output of the first D/A converter in said microcomputer is connected to the first input terminal of said analog circuit controller and the second D/A converter is connected to the second input terminal of said analog circuit controller; and wherein a signal having a level inhibiting the plurality of DC hold circuits of said analog circuit controller from holding the control voltage is inserted into one of the switching signals generated by the second D/A converter of said microcomputer.

4. An analog circuit control system comprising:
- a microcomputer including
  - a first D/A converter for generating control voltages variable into a plurality of levels in a time-divided manner, and
  - a second D/A converter for generating switching signals of variable levels each indicative of the type of a control voltage in synchronism with time-division timing of the control voltages;
- an analog circuit controller using an external control voltage to control a plurality of circuits to be controlled in an analog IC, including
  - a first input terminal to which the control voltage variable into a plurality of levels is applied in a time-divided manner;
  - a second input terminal for receiving switching signals of variable levels each indicative of the type of the control voltage in synchronism with time-division timing for said control voltages;
  - a plurality of DC hold circuits each for holding the control voltage applied thereto through said first input terminal as a DC voltage which is in turn applied to a corresponding one of said plurality of circuits to be controlled; and
  - a comparison/switching control circuit including a plurality of comparators and being operative to discriminate the level of one of the switching signals from said second input terminal so as to actuate a corresponding DC hold circuit; and
- a deflection circuit for generating a TV signal vertical pulse and wherein said controller is operative to take signals through said first and second input terminals during a period in which said vertical pulse is generated, wherein the output of the first D/A converter in said microcomputer is connected to the first input terminal of said analog circuit controller, the output of the second D/A converter is connected to the second input terminal of said analog circuit controller, and said analog IC applies a vertical pulse to said microcomputer so as to transmit said control voltage and said switching signals during a period in which said vertical pulse is applied.

* * * * *